May 30, 1967　　J. S. LE BOEUF ETAL　　3,321,961
SPECIMEN HOLDER FOR TESTING MACHINES
Filed March 6, 1964

Joe S. LeBoeuf
and
Alfred A. Hahn
INVENTORS

BY Robert U. Geib Jr.
ATTORNEY

United States Patent Office 3,321,961
Patented May 30, 1967

3,321,961
SPECIMEN HOLDER FOR TESTING MACHINES
Joe S. Le Boeuf, College Station, and Alfred A. Hahn, Houston, Tex., assignors to Continental Carbon Company, Houston, Tex., a corporation of Delaware
Filed Mar. 6, 1964, Ser. No. 349,866
3 Claims. (Cl. 73—103)

This invention relates to specimen holders for testing machines and particularly testing which employs a rebound pendulum, although not limited thereto.

Rebound pendulum testing machines, such as those of the Goodyear-Healey type, are usually equipped with a specimen holder comprising dual thumbscrews; and a question has arisen as to whether such holders allow the rebound block or specimen to be gripped with the same amount of force during each impact.

In an attempt to ameliorate this situation, a lever-type clamp was developed, but this had a tendency to make the specimen or rebound blocks bulge. Some tests require the rebound blocks to be heated (for example to 212° F.) to such an extent that they bulged when gripped with sufficient force to prevent them from moving during testing.

It is among the objects of the present invention to provide a specimen holder which securely holds the specimen while not at the same time causing the specimen to bulge.

Another object is to grip the specimen with the same amount of force each time it is acted upon; and still another object is to eliminate any tendency for the specimen to move or wander during a test.

Still another object is the provision of a device of the class described which is inexpensive, quick and easy to operate and durable in service.

The foregoing and other objects and advantageous features will become apparent after consideration of the following specification and accompanying drawings; it being understood, however, that the invention contemplates various modifications, etc., within the scope of appended claims.

In the accompanying drawings, which are intented for purposes of illustration only:

Figure 2:
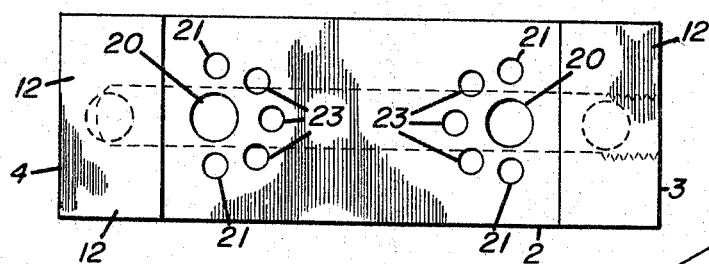
FIGURE 2 is a plan view of the device of FIGURE 1.
Figure 1:
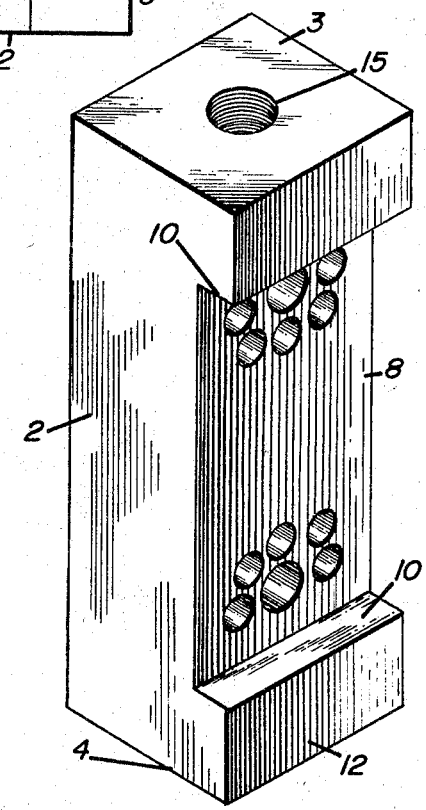
FIGURE 1 is a perspective to a device which is constructed in accordance with the teachings of the present invention.
Figure 3:
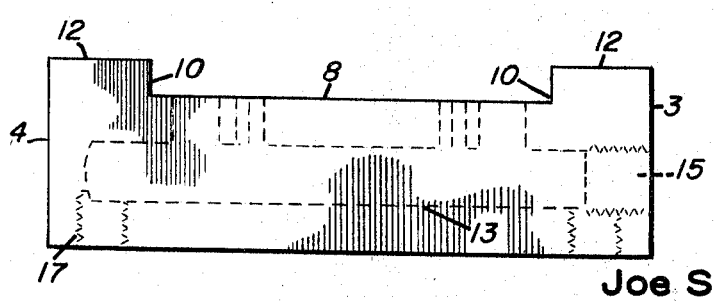
FIGURE 3 is a side elevation.

Referring more particularly to the drawings, the numeral 2 designates the body portion of the device, the same comprising a block which is rectangular in cross-section and flat on each of its ends, as indicated at 3 and 4.

One of the four sides ef the block-like body portion 2 of the device has a recess with a planar bottom 8 and a pair of substantially flat right-angularly extending side-walls 10, thereby providing a substantially rectangular shoulder 12 at each end.

The specimen to be tested (not shown) is to be held in the aforementioned recess.

The center of the body portion 2 is provided with a longitudinal bore 13 which extends, as at 15, through the end 3, the other end of said bore terminating short of the end 4 of the body.

Between the midportion of the body and each of the shoulders 12 is a cluster of apertures which communicate with the planar bottom 8 of the specimen-accommodating recess.

As shown most clearly in FIGURE 2, each of the two clusters of apertures comprises a larger aperture 20 with a smaller aperture 21 at each side thereof; and a series of three apertures 23 disposed between the side apertures 21 in inwardly-bowed relationship.

The side of the body or block 2 which is opposite the planar bottom 8 of the specimen recess is tapped adjacent each of its ends to receive a bolt 17; and it is by means of these bolts that the specimen holder is secured to the testing machine.

The screw-threaded end 15 of the longitudinal bore 13 receives a pipe 30 which communicates with a suction-producing source such as a laboratory vacuum pump (not shown).

When sufficient suction is applied through the apertures 20, 21 and 23, the specimen will be firmly held in the specimen-accommodating recess and particularly when the ends of the specimen engage the flat side-walls 10 of the shoulders 12.

The sufficiency of the vacuum to maintain the specimen against movement was determined by a dial micrometer capable of reading to .001 of an inch, the same being positioned to take readings in both longitudinal and lateral planes.

When working with a vacuum of twenty-seven inches (which is within the limits of most laboratory pumps), movement of the specimen was found to be less than ±.001 either longitudinally or laterally.

In this case the apertures 21 and 23 were 3/16 inch in diameter whereas the diameter of the apertures 20 was 1/2 inch.

While we have shown and described certain specific embodiments of the present invention, it will be readily understood by those skilled in the art that we do not wish to be limited exactly thereto, since various modifications may be made without departing from the scope of the invention as defined in the appended claims.

We claim:

1. A specimen holder for testing machines which subject the specimen to a plurality of impacts for deformation measurements requiring uniform holding of said specimen; said holder comprising a generally rectangular substantially nondeformable block; one of the surfaces of said block defining a substantially flat specimen-engaging surface; a pair of spaced generally rectangular shoulders on said block; said shoulders providing substantially flat abutments adjoining and extending at approximate right-angles to, said substantially flat specimen-engaging surface; said block having an internal passage which is disposed below, and in substantial parallelism with, said substantially flat specimen-engaging surface; said internal passage communicating with the exterior of said block for the attachment thereto of a source of suction; said block having a plurality of apertures communicating with said internal passage and with said substantially flat specimen-engaging surface whereby a specimen having a substantially flat under-surface and a pair of substantially flat ends may be held against said specimen-engaging surface by suction with its substantially flat ends in contact with the substantially flat abutments provided by the adjacent surfaces of the generally rectangular shoulders on said block.

2. The specimen holder of claim 1 wherein the apertures which provide communication between the internal passage in the block and the substantially flat specimen-engaging surface therefor are arranged in clusters adjacent the aforementioned generally rectangular shoulders.

3. The specimen holder of claim 1 wherein the apertures which provide communication between the internal passage in the block and the substantially flat specimen-engaging surface thereof are arranged in clusters adjacent the aforementioned generally rectangular shoulders and wherein certain of the apertures in each cluster vary in diameter.

(References on following page)

References Cited

UNITED STATES PATENTS

| | | | |
|---|---|---|---|
| 661,840 | 11/1900 | Baker | 269—21 X |
| 785,965 | 3/1905 | Meagher | 269—319 X |
| 2,694,337 | 11/1954 | Anander | 269—21 X |
| 2,724,264 | 11/1955 | Dart et al. | 73—103 X |
| 2,782,574 | 2/1957 | Cupold | 269—21 X |
| 2,875,610 | 3/1959 | Huyser | 73—103 |
| 2,908,163 | 10/1959 | McClelland | 73—103 |

RICHARD C. QUEISSER, *Primary Examiner.*

J. W. MYRACLE, *Assistant Examiner.*